J. ADAIR.
PAPER-FASTENER.
No. 171,712. Patented Jan. 4, 1876.
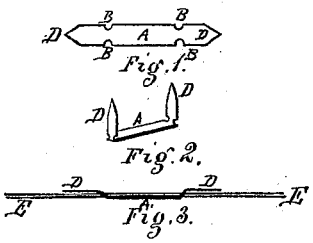
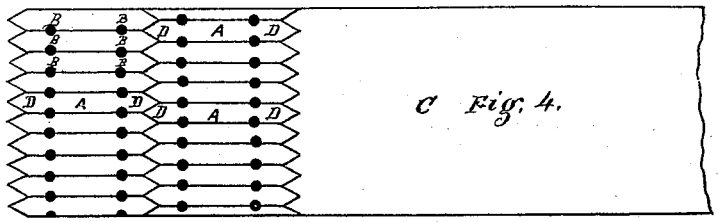

UNITED STATES PATENT OFFICE.

JAMES ADAIR, OF KILLBUCK TOWNSHIP, (PITTSBURG P. O.,) PENNSYLVANIA.

IMPROVEMENT IN PAPER-FASTENERS.

Specification forming part of Letters Patent No. 171,712, dated January 4, 1876; application filed November 29, 1875.

*To all whom it may concern:*

Be it known that I, JAMES ADAIR, of Killbuck township, (Pittsburg P. O.,) State of Pennsylvania, have invented a Paper-Fastener, of which the following is a specification:

The object of my invention is to cheaply make, from a metallic strip or sheet of uniform width and thickness, with small use and waste of material, a simple and efficient paper-fastener, easily applied and intentionally withdrawn, and showing uniform width and thickness on both sides of the paper; and it consists in dividing a metallic strip or flattened pin of suitable length, uniform width, and, preferably, pointed at both ends, into a body or shank, A, in the representative Figures 1, 5, 8, 13, and 17 of the accompanying drawing, and two terminating prongs, D, by nicking, notching, cutting, punching, serrating, or otherwise partially separating the metal, thereby locally weakening it and determining the bending-points, as at B, Figs. 1, 12, 16, and 21; G, Figs. 5 and 7; H, Figs. 8, 11, 14, 15, and 22, and as at F, Figs. 17 and 19, so that the prongs D, Figs. 2, 6, 9, 20, and 23, will more readily bend up at right angles to the body or shank A, the fastener thus resembling three sides of a square, and being ready for use by passing the prongs D, Fig. 2, through the paper E, Figs. 3 and 18, and bending them down away from each other until they lie flat upon the paper and parallel with the body or shank A, but separated therefrom by the thickness of the paper, the shape, wave, or wrinkle thus readily assumed by the fastener, Figs. 2, 10, 13, and 18, in consequence of the weakening of the metal where it is surrounded by or penetrates the paper, tending to hold the fastener from slipping out of its final position. It further consists in nicking, notching, cutting, punching, or serrating a blank of uniform width, as shown in Figs. 1, 8, 11, 12, 14, 15, 16, 17, 19, 21, and 22, so that the nicks, notches, cuts, teeth, arrow-heads, or other like impediments produced without thickening the metal will also tend to hold the fastener in its final position, Figs. 3, 10, 13, by engaging with the paper where penetrated, as at F, Fig. 18. The nicks or notches B, Figs. 1, 12, 16, and 21, and the cuts H, Figs. 8, 11, 14, 15, and 22; F, Figs. 17, 19, and 20, may be repeated throughout the whole length of the blank, their directions changed, if desired, and the bends made at any selected weakened place.

The following is an economical mode of making these fasteners from the metal sheet C, Fig. 4, which is divided into webs or ribbons having saw-tooth or zigzag edges, and of a width corresponding with the length of the required fastener, each tooth or ∧-point representing the point of a prong, D, Fig. 4: The removal of one ribbon of zigzag edges from the sheet C, Fig. 4, leaves a duplicate zigzag edge for the next succeeding ribbon, whereby but a small amount of scrap is produced in obtaining the pointed prongs, and by first punching in the ribbon-holes G, Figs. 5 and 7, or cuts or incisions F, Figs. 17 and 19, and H, Fig. 11, on the central line of each required fastener, or by punching holes B, Fig. 4, or making suitable cuts or incisions on the horizontal lines dividing one fastener-blank from another where these lines are intersected by the vertical lines dividing the prongs D from the shanks A, Fig. 4, the mere act of shearing or separating one blank from another develops or results in blanks pointed at both ends, weakened between the shanks and prongs, where the angles or bends are to be formed, and showing holes, nicks, notches, cuts, serrations, or impediments to engage with the paper when the blank is bent into a rectangular shape for use. Other ways of weakening the blank and producing impediments at the intended angles might be shown; but those already indicated in the drawing, especially Figs. 1, 16, and 21, are deemed the best.

The most obvious advantages of my paper-fastener are the following, viz: They can be produced with little labor and loss in scrap. They can be easily applied to, and by reverse movements detached from, the paper. They show equal width on both sides of the paper, and but a single thickness of plane metal at all points—the latter a very great merit when numerous sets of papers secured by fasteners are required to be put up in bundles. They are merchantable when unbent, as in Fig. 1, and can be put up in papers, bundles, or boxes, for mailing or shipping, with great economy of space.

I am aware that flat double-pointed pins or paper-fasteners have heretofore been used, some having slots or teats on the legs or prongs, others showing two and three thicknesses of metal between which the paper is confined, and others showing a body wider than the prongs; and I am also aware that the method of cutting pointed fasteners from a plate of metal without waste after the first cut is not new; but

I claim as my invention—

1. A paper-fastener consisting of a shank or body, A, and terminating prongs D, bent at right angles thereto, and having the prongs weakened externally or internally at the corners or angles, substantially as and for the purpose specified.

2. A paper-fastener having nicks, notches, or serrations on the edges of its penetrating-prongs, for engaging with the paper where penetrated, substantially as described.

JAMES ADAIR.

Witnesses:
R. G. HOPE,
FRANCIS L. CLARK.